H. L. ERICKSSON.
LAWN TRIMMER.
APPLICATION FILED JULY 6, 1916.
1,218,173. Patented Mar. 6, 1917.
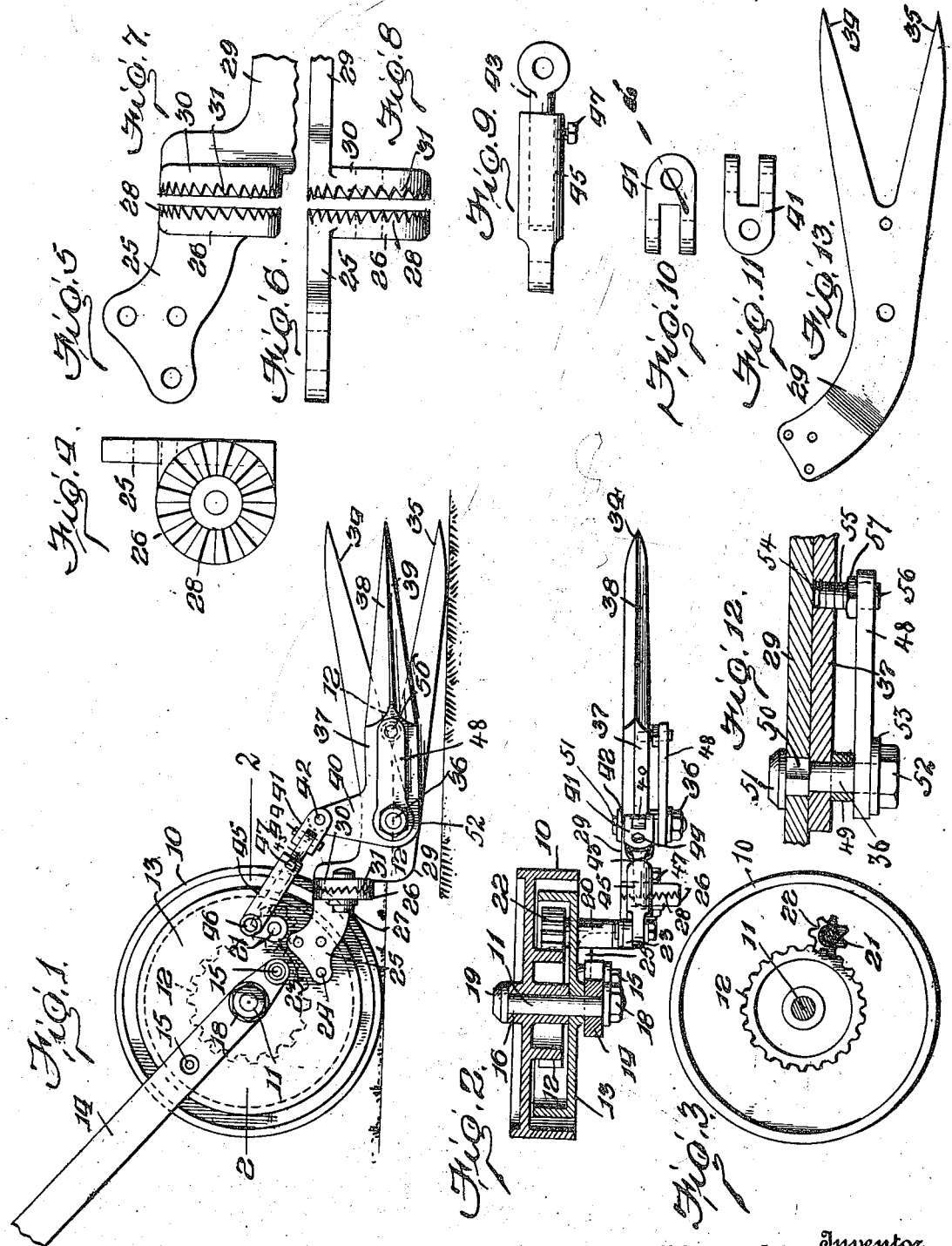
Inventor
Harold L. Ericksson
By
Attorneys

UNITED STATES PATENT OFFICE.

HAROLD L. ERICKSSON, OF LARCHMONT, NEW YORK.

LAWN-TRIMMER.

1,218,173.  Specification of Letters Patent.  Patented Mar. 6, 1917.

Application filed July 6, 1916. Serial No. 107,796.

*To all whom it may concern:*

Be it known that I, HAROLD L. ERICKSSON, a citizen of the United States, residing at Larchmont, in the county of Westchester and State of New York, have invented certain new and useful Improvements in Lawn-Trimmers, of which the following is a specification.

This invention relates to improvements in lawn trimmers, and has for one of its objects to simplify and improve the construction and increase the efficiency and utility of devices of this character.

Another object of the invention is to provide a device of this character which may be adjusted to trim the edges of lawns or to trim the surfaces of lawns beneath bushes, around trees and like locations.

With these and other objects in view, the invention consists in certain novel features of construction, as hereinafter shown and described and then specifically pointed out in the claims; and in the drawings illustrative of the preferred embodiment of the invention—

Figure 1 is a side elevation of the improved device;

Fig. 2 is a plan view with portions in section on the line 2—2 of Fig. 1;

Fig. 3 is an elevation of the main drive wheel and its gearing;

Fig. 4 is an enlarged front elevation;

Fig. 5 is an enlarged side elevation, and

Fig. 6 is an enlarged detached plan view of the main coupling bracket;

Fig. 7 is an enlarged side elevation, and

Fig. 8 is an enlarged plan view of a portion of the main stationary cutting member;

Fig. 9 is an enlarged plan view of the adjustable coupling rod;

Fig. 10 is an enlarged plan view, and

Fig. 11 is an enlarged side view of the coupling clip;

Fig. 12 is an enlarged sectional detail on the line 12—12 of Fig. 1;

Fig. 13 is a side elevation of a modified form of the stationary cutting member.

Corresponding and like parts are referred to in the following description and indicated in all the views of the drawings by the same reference characters.

The improved device comprises a main drive wheel or drum 10 mounted for rotation upon a stub shaft 11 and provided with an internal gear 12. Carried by the stub shaft 11 is a hood device represented as a whole at 13 and directed within the interior of the drum 10 and over the gear 12 and guarding and protecting the same. The operating handle, represented as a whole at 14, is bolted or otherwise secured at 15 to the hood 13 and thus maintains the latter in stationary position relative to the shaft 11. The shaft 11 is provided with a clamp nut 18 at one end and a head 19 at the other, so that the parts 10, 13 and 14 may be maintained in position upon the shaft with the drum 10 free to rotate on the shaft. Extending from the hood member 13 is a sleeve or hollow stud 20 to form a bearing for another stub shaft, indicated at 21, and carrying a gear pinion 22 within the hood and engaging the teeth of the gear 12, as illustrated more fully in Fig. 3. Connected to the outer end of the stub shaft 21 is a crank member 23, and rotative with the shaft 21 externally of the hood.

Rigidly connected at 24 to the hood member 13 is a bracket device 25, and extending laterally from the free end of the bracket is a disk 26 having a centering aperture to receive a clamp bolt 27 and with radiating V-shaped ribs 28. The gathering member comprises a body portion 29 having a laterally directed disk 30 provided with radial ribs 31, the disk 30 being mounted to rotate upon the clamp bolt 27 with its ribs 31 engaging the ribs 28. The body 29 is extended forwardly and forked, as shown in Fig. 1, the confronting edges 34—35 of the forked portion being knife-edged or forming stationary shear blades or cutting members and likewise operating to gather the grass which is to be severed. By this arrangement the combined gathering and stationary shearing member may be set to operate vertically or horizontally as may be preferred, or at any intermediate point by adjusting the disks 26 and 30, as will be obvious.

Pivoted at 36 to the body 29 is a movable shear blade or cutting member, represented as a whole at 37, and formed with oppositely disposed cutting edges 38—39 operative alternately over the cutting portions 34—35 of the gathering member. Extending from the body portion 37 of the movable cutting member is an extension 40. The free end of the extension 40 carries a coupling member comprising a body portion 41 forked at the ends, the forked portions being at right angles to each other, as shown in Figs. 10 and 11.

The member 41 is pivoted at 42 to the member 40, while a rod 43 is pivoted at 44 to the opposite end of the member 41.

At its free end the rod 43 is received in a tubular member 45 which is pivoted at 46 to the crank 23. The rod 43 is thus adjustable in the tubular member and is held in its adjusted position by a set screw 47. When the gathering member is operating vertically, as shown in Figs. 1 and 2, the member 41 will swing upon the pivot 42, and when the gathering member is arranged to operate horizontally, the rod 43 will swing upon the pivot 44 while the member 41 will be held from movement upon the member 40 by any suitable means, for instance by a clamp nut.

When the gathering member is operating horizontally the distance between the pivots 42 and 46 is greater than when the gathering member is operating vertically, hence the necessity for employing the longitudinally adjustable connecting members 43 and 45, and the coupling member 41.

By this arrangement it will be obvious that when the traction member 10 is moved over the ground by force applied to the handle 14 the motion of the gear 12 will be imparted to the crank 23 by its action upon the pinion 22 and thus communicate the motion of the crank to the movable cutting member 37 through the coaction of the sleeve 45 and the rod 43. When employed for trimming the edges of lawns the position of the gathering member will be readily controlled by the handle 14 so that the lower forked portion 35 will move upon the ground or in close proximity thereto adjacent to the edge of the lawn as disclosed in Fig. 1, and as the device is moved forwardly the lower cutting portion 35 will travel beneath the overhanging grass of the lawn while the upper cutting portion 34 moves over the upper face of the overhanging grass and gathers the same between the diverging portions 34—35 in position to be severed by the rapidly moving cutting member 37, and thus uniformly trims the edge of the lawn.

When the device is to be employed upon the surface of the lawn, the set screw 47 is released and clamp bolt 27 loosened to a sufficient extent to release the ribs or teeth 28—31 and permit the member 29 to be disposed in horizontal position. The clamp bolt 27 is then tightened and the set screw 47 also set up to hold the rod 43 in its new position. When thus arranged the device may be employed for trimming the lawn beneath shrubbery or around trees where the ordinary lawn mower cannot be employed.

The efficiency and utility of the device is thus materially increased and without material increase of expense or complication of the parts.

Mounted upon the pin 36 externally of the member 37 is a holding blade or bar 48, the bar being spaced from the member 37 by a sleeve washer 49. The pin 36 is formed with a square or other than round portion 50 engaging in a correspondingly formed aperture through the member 29, so that the member 36 is held from turning. The member 36 is provided with a head 51 at one end bearing against the inner face of the body 29 and with a nut 52 and a washer 53 externally of the bar 48. The member 37 is provided with a threaded aperture 54 to receive a threaded adjusting pin 55, the latter having a reduced outer terminal 56 to engage rotatively through the bar 48 and likewise provided with a wrench receiving enlargement 57 which bears against the inner face of the bar 48, as shown in Fig. 12. The bar 48 being held rigidly in position the tension of the member 37 relative to the member 29 may be adjusted as will be obvious by correspondingly adjusting the bolt 55 by power applied to the enlargement 57. Thus the tension between the cutting blades may be controlled as required.

The improved device is simple in construction, can be inexpensively manufactured and applied, and operates effectually for the purposes described.

Having thus described the invention, what is claimed as new is:

1. In a lawn trimmer, a traction member including an annular rim having a web forming a closure to one side of the rim and open at the other side and having motion imparting means connected to the web, a hood device including a web and a rim extending into the traction member and inclosing the motion imparting means, a stud carried by said hood device and upon which said traction member is mounted for rotation, a combined gathering and stationary shearing member carried by said hood device and bifurcated with the free ends diverging, a movable cutting member mounted upon said gathering and stationary shearing member for moving over the bifurcated portion of the same and cooperating therewith to effect a cutting operation, a means for transmitting the motion of said traction member to said movable cutter.

2. In a lawn trimmer, a traction member including an annular rim having a web forming a closure to one side and open at the other side, said traction member having motion imparting means connected to its web, a hood device including a web and a rim extending into the traction member and inclosing the motion imparting means, a stud carried by said hood device and upon which said traction member is mounted for rotation, a combined gathering and stationary shearing member carried by said hood device, a movable cutting member mounted upon said combined gathering and stationary shearing member and coöperating therewith to effect a cutting operation, means for adjusting said gathering member relative to said hood, and means for transmitting the motion of said traction member to said movable cutter.

3. In a lawn trimmer, a traction member having a gear wheel rotative therewith, a pinion engaging said wheel and having a cranked axle, a combined gathering and stationary shearing member associated with said traction member, a cutter pivoted to said gathering member and having an arm extending therefrom, said cutting member coöperating with said gathering and shearing member to effect a cutting operation, a connecting member pivoted to said arm and to the crank of said axle, means for longitudinally adjusting said connecting member, and means for adjusting said gathering member relative to said traction member.

4. In a lawn trimmer, a traction member having motion imparting means, a hood device inclosing the motion imparting means, means for mounting said traction member for rotation relative to said hood, a bracket device carried by said hood device, a gathering member adjustably coupled to said bracket device, a movable cutting member mounted upon said gathering member and coöperating therewith to effect a cutting operation, and means for transmitting the motion of said traction member to said movable cutter.

5. In a lawn trimmer, a traction member having a motion imparting means, a holding means, means for preventing the rotation of said holding means, means for transmitting motion from said motion imparting means, a bracket device carried by said holding means, a combined gathering and stationary shearing member, means for adjustably coupling said combined gathering and stationary shearing member to said bracket device, a cutter member movably mounted upon said gathering member and coöperating therewith to effect a cutting operation, and means for transmitting the motion of said traction member to said movable cutter.

In testimony whereof I affix my signature.

HAROLD L. ERICKSSON. [L. S.]